(12) United States Patent
Toelkes et al.

(10) Patent No.: US 8,862,851 B2
(45) Date of Patent: Oct. 14, 2014

(54) ARCHITECTURE FOR ADDRESS MAPPING OF MANAGED NON-VOLATILE MEMORY

(71) Applicant: Apple Inc., Cupertino, CA (US)

(72) Inventors: Tahoma Toelkes, San Jose, CA (US); Nir Jacob Wakrat, Los Altos, CA (US); Kenneth L Herman, San Jose, CA (US); Barry Corlett, Brisbane, CA (US); Vadim Khmelnitsky, Foster City, CA (US); Anthony Fai, Palo Alto, CA (US); Daniel Jeffrey Post, Campbell, CA (US); Hsiao Thio, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/725,671

(22) Filed: Dec. 21, 2012

(65) Prior Publication Data
US 2013/0212318 A1 Aug. 15, 2013

Related U.S. Application Data

(62) Division of application No. 12/614,369, filed on Nov. 6, 2009, now Pat. No. 8,370,603.

(60) Provisional application No. 61/140,436, filed on Dec. 23, 2008.

(51) Int. Cl.
*G06F 12/00* (2006.01)
*G06F 13/00* (2006.01)
*G06F 13/28* (2006.01)
*G06F 12/02* (2006.01)
*G06F 12/06* (2006.01)

(52) U.S. Cl.
CPC .... *G06F 12/0246* (2013.01); *G06F 2212/1016* (2013.01); *G06F 2212/7208* (2013.01); *G06F 12/0607* (2013.01)

USPC .......................................... 711/168; 711/154

(58) Field of Classification Search
CPC ................ G06F 12/0246; G06F 12/06; G06F 2212/2022; G06F 2212/7208
USPC .................................................. 711/154, 168
See application file for complete search history.

(56) References Cited

U.S. PATENT DOCUMENTS

| 4,937,830 A | 6/1990 | Kawashima et al. |
| 5,341,489 A | 8/1994 | Heiberger et al. |

(Continued)

FOREIGN PATENT DOCUMENTS

| JP | 61217999 | 9/1986 |
| JP | 01223700 | 9/1989 |

(Continued)

OTHER PUBLICATIONS

International Search Report/Written Opinion in PCT/US2010/032627, mailed Jul. 21, 2010, 12 pages.

(Continued)

*Primary Examiner* — Ryan Bertram
(74) *Attorney, Agent, or Firm* — Meyertons, Hood, Kivlin, Kowert & Goetzel, P.C.

(57) ABSTRACT

The disclosed architecture uses address mapping to map a block address on a host interface to an internal block address of a non-volatile memory (NVM) device. The block address is mapped to an internal chip select for selecting a Concurrently Addressable Unit (CAU) identified by the block address. The disclosed architecture supports generic NVM commands for read, write, erase and get status operations. The architecture also supports an extended command set for supporting read and write operations that leverage a multiple CAU architecture.

15 Claims, 12 Drawing Sheets

(56) References Cited

U.S. PATENT DOCUMENTS

| | | | |
|---|---|---|---|
| 5,434,872 | A | 7/1995 | Petersen et al. |
| 5,524,218 | A | 6/1996 | Byers et al. |
| 5,559,449 | A | 9/1996 | Padoan et al. |
| 5,613,144 | A | 3/1997 | Hall et al. |
| 5,615,162 | A | 3/1997 | Houston |
| 5,673,223 | A | 9/1997 | Park |
| 5,732,094 | A | 3/1998 | Petersen et al. |
| 5,751,631 | A | 5/1998 | Liu et al. |
| 6,092,158 | A | 7/2000 | Harriman et al. |
| 6,134,149 | A | 10/2000 | Lin |
| 6,148,354 | A | 11/2000 | Ban et al. |
| 6,449,111 | B1 | 9/2002 | Kool et al. |
| 6,684,301 | B1 | 1/2004 | Martin |
| 7,372,715 | B2 | 5/2008 | Han |
| 7,374,108 | B2 | 5/2008 | Toombs et al. |
| 7,975,109 | B2 | 7/2011 | McWilliams et al. |
| 7,979,658 | B2 | 7/2011 | Obereiner et al. |
| 2002/0141032 | A1 | 10/2002 | Guarr et al. |
| 2002/0194451 | A1* | 12/2002 | Mukaida et al. ............. 711/203 |
| 2003/0046628 | A1 | 3/2003 | Rankin |
| 2003/0200411 | A1 | 10/2003 | Maeda et al. |
| 2004/0139286 | A1 | 7/2004 | Lin et al. |
| 2004/0153902 | A1 | 8/2004 | Machado et al. |
| 2004/0257888 | A1 | 12/2004 | Noguchi et al. |
| 2005/0166007 | A1 | 7/2005 | Ono |
| 2006/0059406 | A1 | 3/2006 | Micheloni et al. |
| 2006/0164907 | A1 | 7/2006 | Nguyen |
| 2006/0248432 | A1 | 11/2006 | Barrett |
| 2007/0043900 | A1 | 2/2007 | Yun |
| 2007/0050668 | A1 | 3/2007 | Gans |
| 2007/0106919 | A1 | 5/2007 | Chang et al. |
| 2007/0140007 | A1 | 6/2007 | Terauchi |
| 2007/0165458 | A1 | 7/2007 | Leong et al. |
| 2007/0168625 | A1 | 7/2007 | Cornwell et al. |
| 2008/0069098 | A1 | 3/2008 | Shah et al. |
| 2008/0126776 | A1 | 5/2008 | Takayama |
| 2008/0147968 | A1 | 6/2008 | Lee et al. |
| 2008/0147994 | A1 | 6/2008 | Jeong et al. |
| 2008/0195799 | A1 | 8/2008 | Park et al. |
| 2008/0211303 | A1 | 9/2008 | Ikegawa |
| 2008/0288814 | A1 | 11/2008 | Kitahara |
| 2009/0063934 | A1 | 3/2009 | Jo |
| 2009/0100115 | A1 | 4/2009 | Park et al. |
| 2009/0113114 | A1 | 4/2009 | Berenbaum et al. |
| 2009/0164698 | A1 | 6/2009 | Ji et al. |
| 2009/0198902 | A1 | 8/2009 | Khmelnitsky et al. |
| 2009/0198947 | A1 | 8/2009 | Khmelnitsky et al. |
| 2009/0198952 | A1 | 8/2009 | Khmelnitsky et al. |
| 2009/0265513 | A1 | 10/2009 | Ryu |
| 2009/0300271 | A1* | 12/2009 | Yang et al. .................... 711/103 |
| 2010/0250836 | A1 | 9/2010 | Sokolov et al. |
| 2010/0287329 | A1 | 11/2010 | Toelkes et al. |
| 2010/0287353 | A1 | 11/2010 | Khmelnitsky et al. |
| 2010/0287446 | A1 | 11/2010 | Post et al. |
| 2011/0022781 | A1 | 1/2011 | Wakrat et al. |
| 2011/0066789 | A1 | 3/2011 | Wakrat et al. |
| 2011/0066869 | A1 | 3/2011 | Wakrat et al. |
| 2011/0153911 | A1 | 6/2011 | Sprouse et al. |
| 2011/0213945 | A1 | 9/2011 | Post et al. |

FOREIGN PATENT DOCUMENTS

| | | |
|---|---|---|
| JP | 06-124231 | 5/1994 |
| JP | 2000-066949 | 3/2000 |
| JP | 2000-067574 | 3/2000 |
| JP | 2000-163273 | 6/2000 |
| WO | 2007145883 | 12/2007 |

OTHER PUBLICATIONS

"TC58NVG0S3ETA00: Toshiba Mos Digital Integrated Circuit Silicon Gate CMOS," Toshiba, Nov. 20, 2008, revision 1.00, Semico Toshiba, pp. 1-29.

International Search Report/Written Opinion in PCT/US2010/032628, Aug. 11, 2010, 12 pages.

"Increasing Boot Operations with Managed NAND," QuickLogic® White Paper, Quicklogic Corporation, 2009, retrieved from <http://www.quicklogic.com/assets/pdf/white_papers/QLIncreasingBootOptwManagedNANDWPRevE.pdf> on Jan. 23, 2013, pp. 1-8.

"Dual supply level translator for dual memory cards (mini SD/micro SD +managed NAND)," STMicroelectronics, Paper No. ST6G3240, Apr. 2008, retrieved from <http://www.st.com/internet/com/TECHNICAL_RESOURCES/TECHNICAL_LITERATURE/DATASHEET/CD00190251.pdf> on Jan. 23, 2013, pp. 1-29.

Lim, Seung-Ho; Park, Kyu-Ho; "An Efficient NAND Flash File System for Flash Memory Storage," IEEE Transactions on Computers, Jul. 2006, vol. 55 (No. 7); pp. 906-912.

International Preliminary Report on Patentability in PCT/US2009/065804 mailed Jun. 29, 2011, 12 pages.

International Preliminary Report on Patentability in PCT/US2010/032627 mailed Nov. 9, 2011, 8 pages.

International Preliminary Report on Patentability in PCT/US2010/032628, Nov. 17, 2011, 8 pages.

International Search Report and Written Opinion for Application No. PCT/US2009/065804, May 10, 2010, 19 pages.

Invitation to Pay Additional Fees and, Where Applicable Protest Fee for Application No. PCT/US2009/065804, dated Mar. 4, 2010, 4 pages.

Office Action from Chinese Patent Application No. 200980157384.5 mailed Jul. 10, 2013(English Translation and Chinese Versions), pp. 1-23.

Office Action from Japanese Patent Application No. 2011-543529, mailed Jun. 19, 2013 (English Translation and Japanese Versions), pp. 1-7.

Office Action and translation thereof in corresponding Japanese Patent Application No. 2011-543529, Feb. 18, 2013, pp. 1-9.

Office Action from Korean Patent Application No. 10-2011-7017378, mailed Dec. 19, 2013, English and Korean Versions, pp. 1-11.

Office Action from Japanese Patent Application No. 2011-543529, mailed Feb. 7, 2014, English and Japanese versions, pp. 1-9.

Office Action from Chinese Application No. 200980157384.5, mailed Apr. 2, 2014, English and Chinese versions, pp. 1-12.

* cited by examiner

| Stride Number | CAU 0 | CAU 1 | CAU 2 |
|---|---|---|---|
| 1 | CAU 0, Block 1 | CAU 1, Block 1 | CAU 2, Block 1 |
| 2 | CAU 0, Block 2 | CAU 1, Block 2 | CAU 2, Block 2 |
| 3 | CAU 0, Block 3 | CAU 1, Block 3 | CAU 2, Block 3 |
| 4 | CAU 0, Block 4 | CAU 1, Block 2000 | CAU 2, Block 4 |
| 5 | CAU 0, Block 5 | CAU 1, Block 5 | CAU 2, Block 5 |
| 6 | CAU 0, Block 6 | CAU 1, Block 6 | CAU 2, Block 6 |
| 7 | CAU 0, Block 7 | CAU 1, Block 7 | CAU 2, Block 7 |
| ...... | ...... | ...... | ...... |
| 1999 | CAU 0, Block 1999 | CAU 1, Block 1999 | CAU 2, Block 1999 |

FIG. 2D ially. NAND relies on Error Correction Code (ECC) to compensate for bits that may flip during normal device operation. When performing erase or program operations, the NAND device can detect blocks that fail to program or erase and mark the blocks as bad in a bad block map. The data can be written to a different, good block, and the bad block map updated.

ARCHITECTURE FOR ADDRESS MAPPING OF MANAGED NON-VOLATILE MEMORY

PRIORITY INFORMATION

This application is a divisional application of U.S. patent application Ser. No. 12/614,369, entitled "ARCHITECTURE FOR ADDRESS MAPPING OF MANAGED NON-VOLATILE MEMORY", filed Nov. 6, 2009, which claims priority to U.S. provisional patent application Ser. No. 61/140,436, filed Dec. 23, 2008.

TECHNICAL FIELD

This subject matter is related generally to access and management of managed non-volatile memory.

BACKGROUND

Flash memory is a type of electrically erasable programmable read-only memory (EEPROM). Because flash memories are non-volatile and relatively dense, they are used to store files and other persistent objects in handheld computers, mobile phones, digital cameras, portable music players, and many other devices in which other storage solutions (e.g., magnetic disks) are inappropriate.

NAND is a type of flash memory that can be accessed like a block device, such as a hard disk or memory card. A typical block size is 32 pages of 512 bytes each for a block size of 16 KB. Each block consists of a number of pages. A typical page size is 512 bytes. Associated with each page are a number of bytes (e.g., 12-16 bytes) that are used for storage of error detection and correction checksums. Reading and programming is performed on a page basis, erasure is performed on a block basis, and data in a block can only be written sequentially. NAND relies on Error Correction Code (ECC) to compensate for bits that may flip during normal device operation. When performing erase or program operations, the NAND device can detect blocks that fail to program or erase and mark the blocks as bad in a bad block map. The data can be written to a different, good block, and the bad block map updated.

Managed NAND devices combine raw NAND with a memory controller to handle error correction and detection, as well as memory management functions of NAND memory. Managed NAND is commercially available in Ball Grid Array (BGA) packages, or other Integrated Circuit (IC) package which supports standardized processor interfaces, such as Multimedia Memory Card (MMC) and Secure Digital (SD) card. A managed NAND device can include a number of NAND devices or dies which can be accessed using one or more chip select signals. A chip select is a control line used in digital electronics to select one chip out of several chips connected to the same bus. The chip select is typically a command pin on most IC packages which connects the input pins on the device to the internal circuitry of that device. When the chip select pin is held in the inactive state, the chip or device ignores changes in the state of its input pins. When the chip select pin is held in the active state, the chip or device responds as if it is the only chip on the bus.

The Open NAND Flash Interface Working Group (ONFI) has developed a standardized low-level interface for NAND flash chips to allow interoperability between conforming NAND devices from different vendors. ONFI specification version 1.0 specifies: a standard physical interface (pin-out) for NAND flash in TSOP-48, WSOP-48, LGA-52, and BGA-63 packages; a standard command set for reading, writing, and erasing NAND flash chips; and a mechanism for self-identification. ONFI specification version 2.0 supports dual channel interfaces, with odd chip selects (also referred to as chip enable or "CE") connected to channel 1 and even CEs connected to channel 2. The physical interface shall have no more than 8 CEs for the entire package.

While the ONFI specifications allow interoperability, the current ONFI specifications do not take full advantage of Managed NAND solutions.

SUMMARY

The disclosed architecture uses address mapping to map a block address on a host interface to an internal block address of a non-volatile memory (NVM) device. The block address is mapped to an internal chip select for selecting a Concurrently Addressable Unit (CAU) identified by the block address. The disclosed architecture supports generic non-volatile memory commands for read, write, erase and get status operations. The architecture also supports an extended command set for supporting read and write operations that leverage a multiple CAU architecture.

BRIEF DESCRIPTION OF THE DRAWINGS

FIG. 2D illustrates the address mapping scheme of FIG. 2C including bad block replacement

DETAILED DESCRIPTION

Memory System Overview

Figure 1:
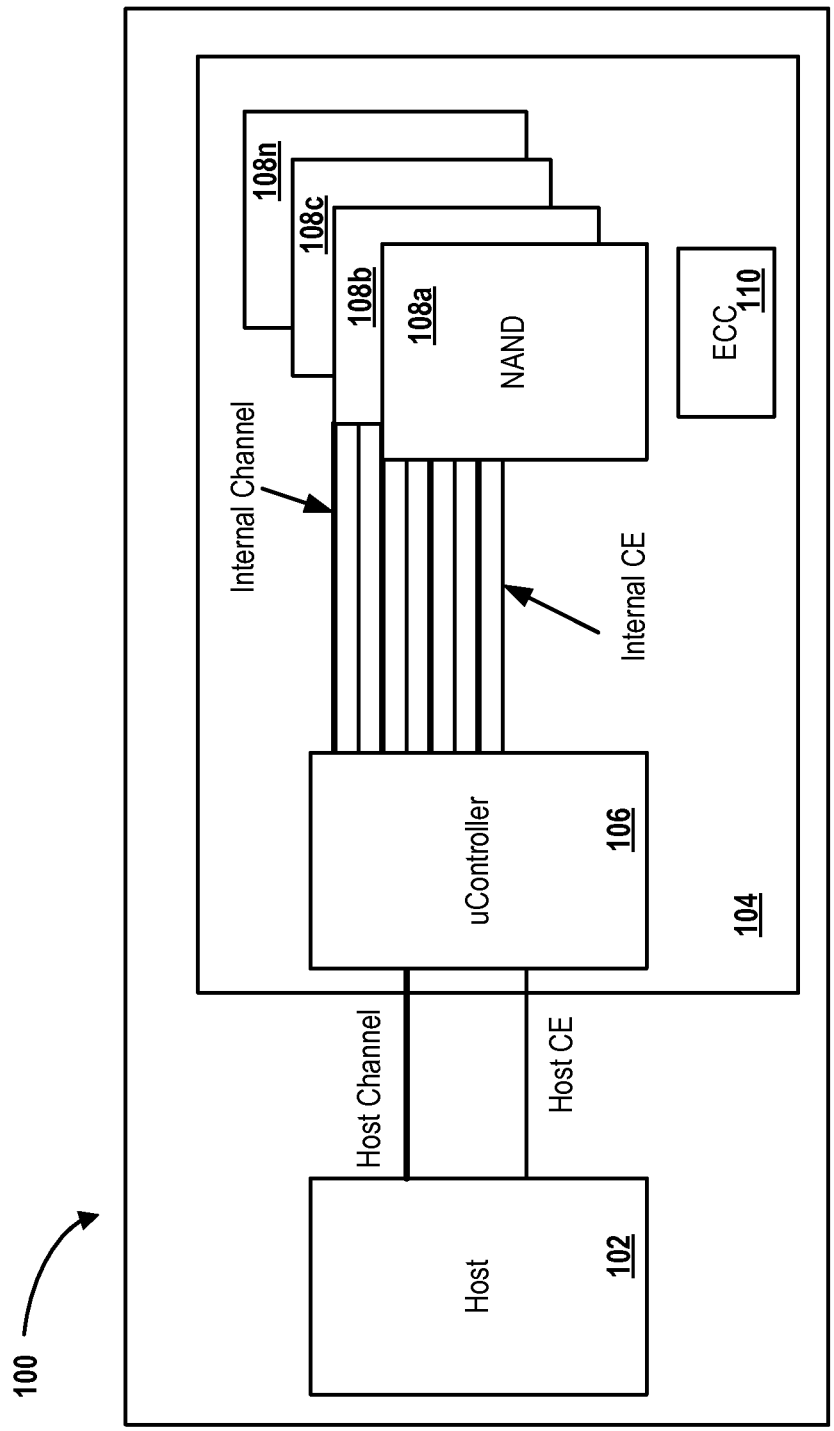
FIG. 1 is a block diagram of an example memory system including a host processor coupled to a managed NVM package.

FIG. 1 is a block diagram of an example memory system 100 including a host processor 102 coupled to a managed NVM package 104 (e.g., a managed NAND package). The NVM package 104 can be a BGA package or other IC package, including multiple NVM devices 108 (e.g., multiple raw NAND devices). The memory system 100 can be used in a variety of devices, including but not limited to: handheld computers, mobile phones, digital cameras, portable music players, toys, thumb drives, email devices, and any other devices in which non-volatile memory is desired or required. As used herein, raw NVM is a memory device or package which is managed by an external host processor, and managed NVM is a memory device or package that includes at least one internal memory management function, such as error correction, wear leveling, bad block management, etc.

In some implementations, the NVM package 104 can include a controller 106 for accessing and managing the NVM devices 108 over internal channels using internal chip select signals. An internal channel is a data path between the controller 106 and a NVM device 108. The controller 106 can perform memory management functions (e.g., wear leveling, bad block management) and can include an error correction (ECC) engine 110 for detecting and correcting data errors (e.g., flipped bits). In some implementations, the ECC engine 110 can be implemented as a hardware component in the controller 106 or as a software component executed by the controller 106. In some implementations, the ECC engine 110 can be located in the NVM devices 108. A pipeline management module 112 can be included that efficiently manages data throughput.

In some implementations, the host processor 102 and NVM package 104 can communicate information (e.g., control commands, addresses, data) over a communication channel visible to the host ("host channel"). The host channel can support standard interfaces, such as raw NAND interfaces or dual channel interfaces, such as is described in ONFI specification version 2.0. The host processor 102 can also provide a host chip enable (CE) signal. The host CE is visible to the host processor 102 to select the host channel.

In the example memory system 100, the NVM package 104 supports CE hiding. CE hiding allows the single host CE to be used for each internal channel in the NVM package 104, thus reducing the number of signals required to support the interface of the NVM package 104. Memory accesses can be mapped to internal channels and the NVM devices 108 using an address space and address mapping, as described in reference to FIG. 2A. Individual NVM devices 108 can be enabled using internal CE signals generated by the controller 106.

Example Address Mapping

Figure 2A:
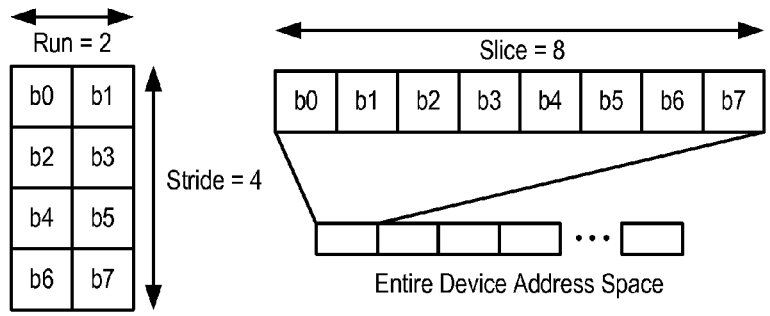
FIG. 2A illustrates an example address mapping for the managed NVM package implementing the address mapping of FIG. 2A.

FIG. 2A illustrates example address mapping for managed NVM. The controller 106 maps a block address received on the host channel to a specific block address internal to a NVM device 108. To facilitate the address mapping, the controller 106 provides the host processor 102 with geometry parameters, including but not limited to: die size, block size, page size, Meta Data Size (MDS), run and stride.

The run and stride parameters enable the host processor 102 to generate efficient sequences of page addresses. The run parameter identifies a number of CAUs in the NVM package 104 that are concurrently addressable using the host CE and address mapping. A CAU can be a portion of the NVM device 108 accessible from a single host channel that may be written or read at the same time as another CAU. A CAU can also be the entire NVM device 108. The stride parameter identifies a number of blocks for vendor specific operation commands within a CAU.

In the example block map shown in FIG. 2A, the NVM package 104 has a run of 2 (i.e., two CAUs) and a stride of 4 (i.e., 4 blocks per CAU), allowing the host processor 102 to generate a slice of 8 blocks: b0, b1, b2, b3, b4, b5, b6, b7. Thus, a slice is a set of blocks totaling run multiplied by stride. NVM packages can be manufactured that have different run and stride values based on the desired application or memory architecture. Note that the block identifiers have been italicized in FIGS. 2A and 2B to visually differentiate blocks belonging to different CAUs.

The MDS parameter identifies a number of bytes associated with each page size allowing for metadata. A page size is a data area of a page of non-volatile memory. A Perfect Page Size (PPS) is a number of bytes equivalent to a page size plus MDS. A Raw Page Size (RPS) is the size of a physical page of non-volatile memory.

Example NVM Package Implementing Address Mapping

Figure 2B:
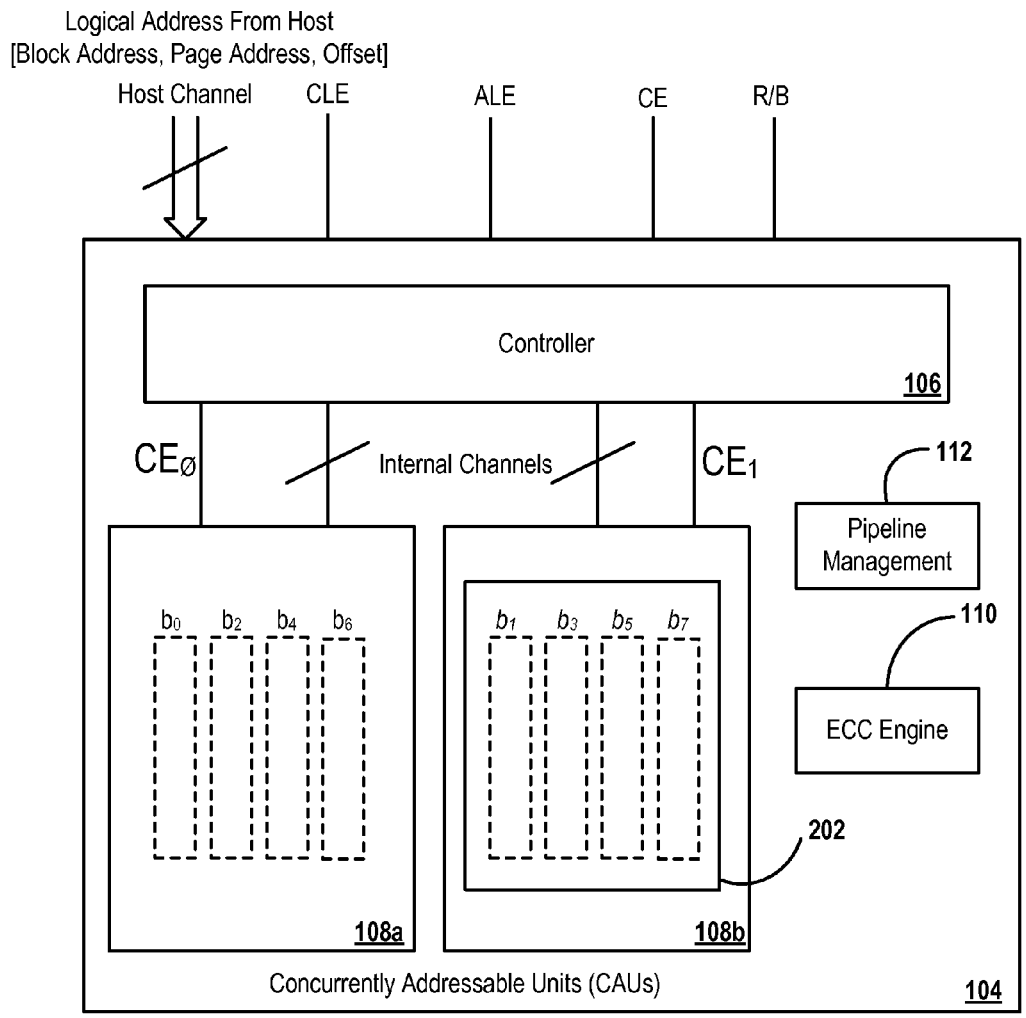
FIG. 2B is a block diagram of the example NVM package of FIG. 1.

FIG. 2B is a block diagram of the example managed NVM package 104 of FIG. 1, implementing the address mapping of FIG. 2A. The NVM package 104 can include a host interface having a host channel, a command latch enable (CLE) input, an address latch enable (ALE) input, a chip enable (CE) input and a read/busy (R/B) input. The host interface can include more or fewer inputs. In this example, the host interface receives a logical address from the host processor 102. The logical address can include bits representing the following fields [Block Address Page Address Offset], as is typical of NVM addressing.

In some implementations, the controller 106 reads the logical address from the host channel and maps Block Address to a specific internal block address using address mapping of FIG. 2A. For example, if the logical address is [0, 0, 0], then Block Address is 0. Block Address is mapped to an internal chip select for NVM device 108a ($CE_\varnothing$). Block Address, Page Address and Offset form a physical address which is used to access a PPS of data from the selected CAU. In this example, the CAU includes the entire physical NVM device 108a, as compared to the CAU 202 which includes a portion of the NVM device 108b. Thus, Block Address performs two functions: 1) facilitating selection of a CAU within a physical NVM device, or a physical NVM device, by mapping bits of the Block Address to the internal CE for the CAU or NVM device; and 2) for providing a physical address to access the block in the selected CAU or NVM device.

In this example, even blocks are mapped to NVM device 108a and odd blocks are mapped to CAU 202 in NVM device 108b. When the controller 106 detects an even number Block Address, the controller 106 activates internal chip enable, $CE_\varnothing$, for NVM device 108a, and when the controller 106 detects an odd number Block Address, the controller 106 activates internal chip enable, $CE_1$, for NVM device 108b. This address mapping scheme can be extended to any desired number of CAUs and/or NVM devices in a managed NVM package. In some implementations the most significant bits of Block Address can be used to select an internal CE and the remaining Block Address bits or the entire Block Address can be combined with Page Address and Offset to for a physical address to access a block to perform an operation. In some implementations, decoding logic can be added to the NVM package or controller 106 to decode Block Address for purposes of selecting an internal CE to activate.

An advantage of the address mapping scheme described above is that the host interface of the NVM package 104 can be simplified (reduced pin count) and still support generic raw NVM commands (e.g., raw NAND commands) for read, write, erase and get status operations. Additionally, extended commands can be used to leverage the multiple CAU architecture. The NVM package 104 supports concurrent read and write operations similar to interleaving commands used with conventional raw NVM architectures (e.g., raw NAND architectures).

In some implementations, the engine 110 performs error correction on data and sends a status to the host processor through the host interface. The status informs the host processor if an operation has failed, allowing the host processor to adjust Block Address to access a different CAU or NVM device. For example, if a large number of errors occurs in response to operations on a particular CAU, the host processor can modify Block Address to avoid activating the internal CE for the defective NVM device.

Figure 2C:
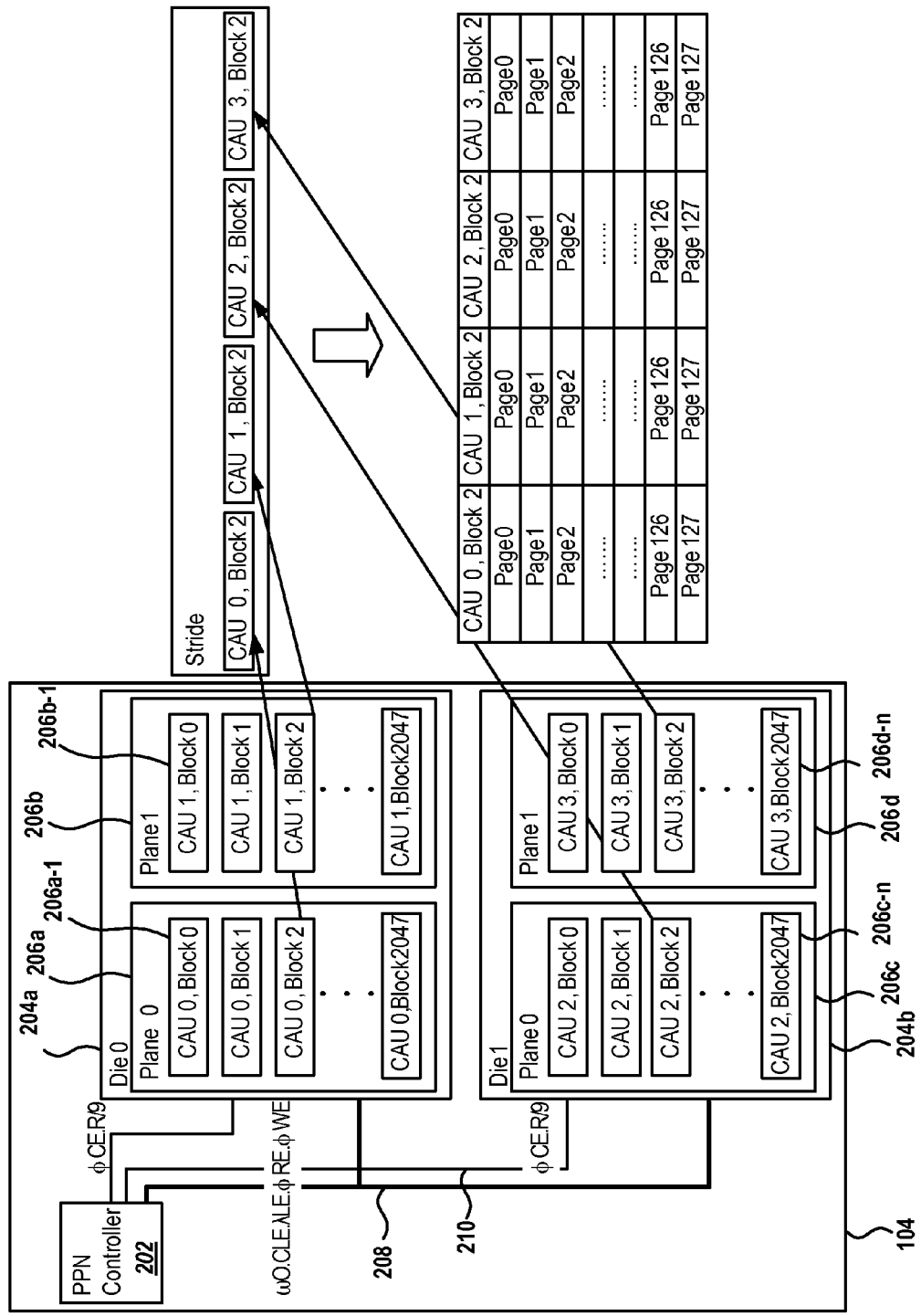
FIG. 2C illustrates an example address mapping scheme for the managed NVM package of FIG. 1.

FIG. 2C illustrates an example address mapping scheme for the managed NVM package 104 of FIG. 1. In particular, the mapping can be used with managed NAND devices that include multiple dies, where each die can potentially include multiple planes. In some implementations, the address mapping operates on Concurrently Addressable Units (CAUs). A CAU is a portion of physical storage accessible from a single host channel that may be read, programmed or erased simultaneously to, or in parallel with other CAUs in the NVM package. A CAU can be, for example, a single plane or a single die. A CAU size is the number of erasable blocks in a CAU.

The mapping will be described using an example memory architecture. For this example architecture, a block size is defined as a number of pages in an erasable block. In some implementations, 16 bytes of metadata are available for each 4 kilobytes of data. Other memory architectures are also possible. For example, the metadata can be allocated more or fewer bytes.

The address mapping scheme shown in FIG. 2C allows the use of raw NAND protocol to read/program/erase NAND blocks and additional commands that enable optimized performance. The NVM package 104 includes an ECC engine (e.g., ECC engine 110) for managing data reliability of the NAND. Thus, the host controller 102 does not need to include an ECC engine 110 or otherwise process data for reliability purposes.

The NVM package 104 defines a CAU as an area that can be accessed (e.g., moving data from the NAND memory cells to an internal register) simultaneous to, or in parallel with other CAUs. In this example architecture, it is assumed that all CAUs include the same number of blocks. In other implementations, CAUs can have a different numbers of blocks. Table I below describes a example row address format for accessing a page in a CAU.

TABLE I

Example Row Address Format

| R[X + Y: X + Y + Z − 1] | R[X: X + Y − 1] | R[0: X − 1] |
|---|---|---|
| CAU | Block | Page |

Referring to Table I, an example n-bit (e.g., 24 bits) row address can be presented to a controller in the NAND device in the following format: [CAU: Block: Page]. CAU is a number (e.g., an integer) that represents a die or plane. Block is a block offset in the CAU identified by the CAU number, and Page is a page offset in the block identified by Block. For example, in a device with 128 pages per block, 8192 blocks per CAU and 6 CAUs: X will be 7 ($2^7$=128), Y will be 13 ($2^{13}$=8192) and Z will be 3 ($2^2$<6<$2^3$).

The example NVM package 104 shown in FIG. 2C includes two NAND dies 204a, 204b, and each die has two planes. For example, die 204a includes planes 206a, 206b. And, die 204b includes planes 206c, 206d. In this example, each plane is a CAU and each CAU has 2048 multi-level cell (MLC) blocks with 128 pages per block. Program and erase operations can be performed on a stride of blocks (a block from each CAU). A stride is defined as an array of blocks each coming from a different CAU. In the example shown, a "stride 0" defines a block 0 from each of CAUs 0-3, a "stride 1" defines a block 1 from each of CAUs 0-3, a "stride 2" defines a block 2 from each of CAUs 0-3 and so forth.

The NVM package includes an NVM controller 202 which communicates with the CAUs through control bus 208 and address/data bus 210. During operation, the NVM controller 202 receives commands from the host controller (not shown) and in response to the command asserts control signals on the control bus 208 and addresses or data on the address/data bus 210 to perform an operation (e.g., read, program, or erase operation) on one or more CAUs. In some implementations, the command includes a row address having the form [CAU: Block: Page], as described in reference to FIG. 2C.

FIG. 2D illustrates the address mapping scheme of FIG. 2C including bad block replacement. In this example, a stride address has been issued by host controller 102 for an NVM package 104 having three CAUs, where one of the CAUs holds a bad block in the stride block offset. A "stride 4" address would normally access CAU0: Block4, CAU1: Block4 and CAU2: Block4. In this example, however, the bad block CAU1: Block4 is replaced by CAU1: Block2000.

Example Command Set

The NVM package 104 is capable of supporting a transparent mode. Transparent mode enables access to a memory array without ECC and can be used to evaluate the performance of the controller 106. The NVM package 104 also supports generic raw NVM commands for read, write and get status operations. Tables 1-3 describe example Read, Write and Commit operations. As with conventional raw NVM, the NVM devices should be ready before a write command is issued. Readiness can be determined using a Status Read operation, as described in reference to Table 4.

TABLE 1

Example Read Operations

| Read Mode | Read Qty | Description |
|---|---|---|
| Normal Page Read | PPS | Page + Metadata is read from the appropriate device and location in the memory array according to the memory address. Error correction is applied to the page read. |
| Transparent Mode Page Read | RPS | Page + Metadata is read from the appropriate device and location in the memory array according to the memory address. Error correction is not applied |
| Stride Read | N × stride × PPS | Read N full stride worth of pages. Error correction is applied. |

TABLE 2

Example Write Operations (Write Mode)

| Write Mode | Read Qty | Description |
|---|---|---|
| Page Write | PPS | Page + Metadata is written to the appropriate device and location in the memory array according to the memory address. An ECC syndrome is calculated for |

TABLE 2-continued

Example Write Operations (Write Mode)

| Write Mode | Read Qty | Description |
|---|---|---|
| Transparent Mode Page Write (single page write) | RPS | the Page + Metadata. Page + Metadata is written to the appropriate device and location in the memory array according to the memory address. An ECC syndrome is not calculated for the Page + Metadata |
| Stride Write | N × stride × PPS | Write N full stride worth of pages. Error correction is applied. |

TABLE 3

Example Write Operations (Commit Mode)

| Commit Mode | Read Qty | Description |
|---|---|---|
| Commit (single page write) | PPS | All non-committed writes are committed to their respective memory arrays. Any corresponding ECC syndromes are also committed. |
| Commit with Page Address (write on a certain CAU) | PPS | Non-committed writes for the CAUs corresponding to the page address are committed to their respective memory array. Any corresponding ECC syndromes are also committed. |

TABLE 4

Example Status Read Operations

| Status Mode | Description |
|---|---|
| Status | A ready status is returned if all internal devices and the controller are ready to receive new data or commands. |
| Status with Address | A ready status is returned if the CAU corresponding to the page address and the controller are ready to receive new data. In addition, the following data is returned: For the CAU + controller: ready (I/O 6). bit flip counter - all on a second byte. For the page address: operation error (I/O 0) refresh block (I/O 1) - suggest to move data to new block and retire current block. Host processor to determine when to move data. Read operations still allowed on current block, but not write/erase operations. retire block (I/O 2) - host processor must move data to new block and retire current block. Read operations still allowed on current block, but no write/erase. stride address error (I/O 3) - indicates that host processor is trying to access an illegal stride address. read (I/O 4). |

In addition to the operations described above, the controller 106 can support various other commands. A Page Parameter Read command returns geometry parameters from the NVM package 104. Some examples of geometry parameters include but are not limited to: die size, block size, page size, MDS, run and stride. An Abort command causes the controller 106 to monitor the current operation and stop subsequent stride operations in progress. A Reset command stops the current operation, making the contents of the memory cells that are being altered invalid. A command register in the controller 106 is cleared in preparation for the next command. A Read ID command returns a product identification. A Read Timing command returns the setup, hold and delay times for write and erase commands. A Read Device Parameter command returns specific identification for a NVM package 104, including specification support, device version and firmware version.

An example command set is described in Table 5 below.

TABLE 5

Example Command Set

| Function | $1^{st}$ Set | $2^{nd}$ Set |
|---|---|---|
| Page Read | 00h | 30h |
| Page Read with Address | 07h | 37h |
| Stride Read | 09h - - - 09h | 39h |
| Page Write | 80h | 10h |
| Page Write with Address | 87h | 17h |
| Stride Write | 89h - - - 89h | 19h |
| Block Erase | 60h | D0h |
| Block Erase with Address | 67h | D7h |
| Read Status | 70h | — |
| Read Status with Address | 77h | — |
| Read Bit Flip Counter | 72h | — |
| Read ID | 90h | — |
| Read Timing | 91h | — |
| Read Device Parameter | 92h | — |
| Reset | FFh | — |
| Abort | 99h | — |

Example Read, Write & Erase Operations

To leverage the multiple CAU architecture in the NVM package 104, the NVM package 104 can support access to all or several CAUs using an extended command set. The NVM package 104 can support the following extended commands, where all addresses are aligned to the PPS: Read with Address, Write with Address, Erase with Address, and Status with Address. FIGS. 3-7 indicate where interleaving across CAUs may occur. The points at where interleaving may occur (referred to as "Interleaving Points") are indicated by circles. The start point and end point of each operation appear as white and cross-hatch-filled circles, respectively, since each represent an interleaving point, and all intermediate points where interleaving may occur are indicated by stripe-filled circles. FIGS. 3-7 assume that the NVM package is in a fully ready state after a sequence of operations.

Figure 3:
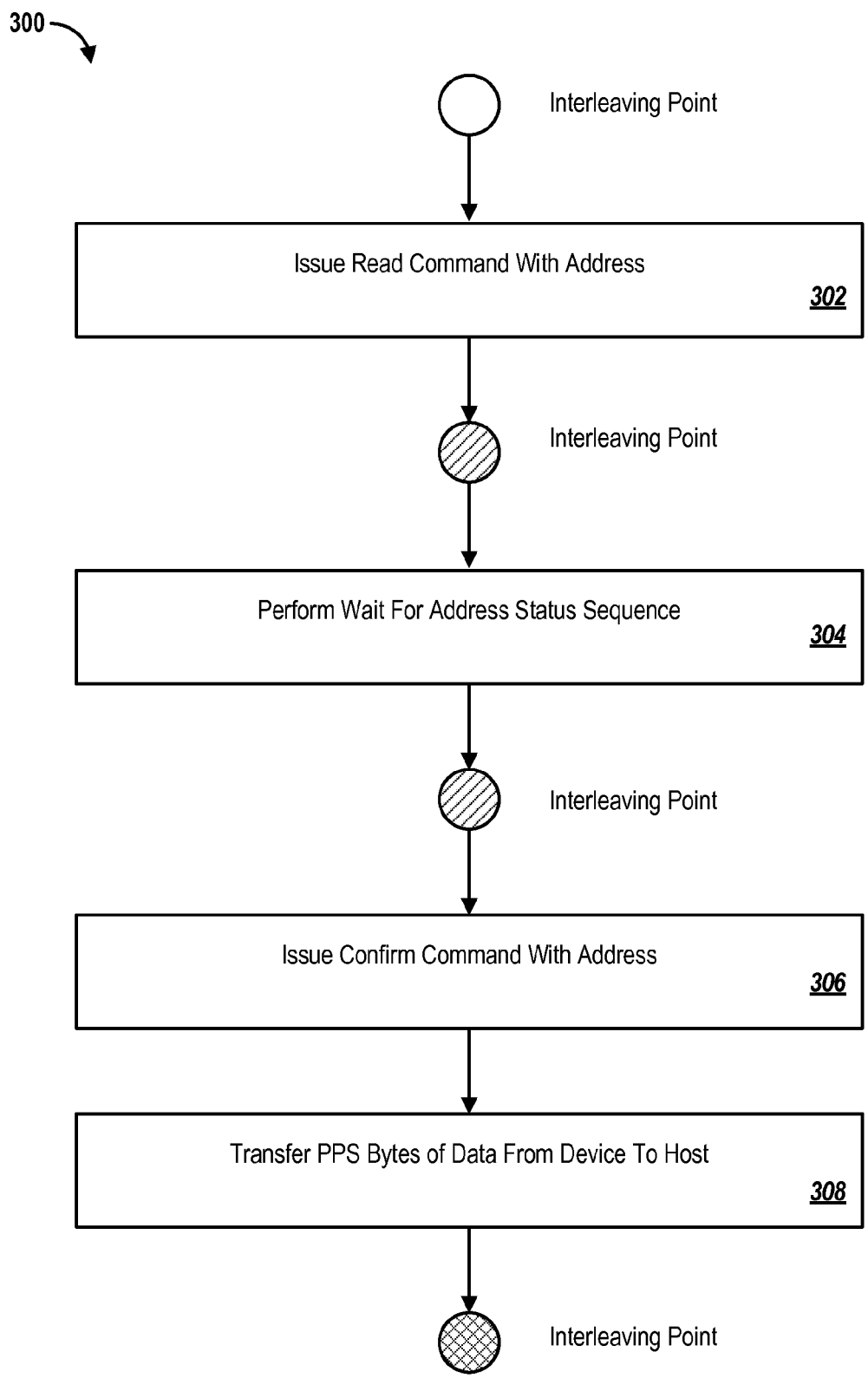
FIG. 3 is a flow a diagram of an example operation using Read with Address command.

FIG. 3 is a flow a diagram of an example operation 300 using a Read command with Address. In step 302, the host processor issues a Read command with Address to the NVM package. In step 304, the host processor performs a Wait for Address status sequence until the NVM package provides a status indicating that the Address is ready to be read. In step 306, the host processor issues a Confirm command with Address to the NVM package. In step 308, the controller in the NVM package transfers PPS bytes of data to the host processor over the host channel. Error correction is applied to the bytes in the NVM package using an ECC engine (e.g., ECC engine 110). In this example Read command with Address operation, interleaving points may occur at the beginning and end of the operation and between intermediate steps 302 and 304 and intermediate steps 304 and 306 of the operation.

An example Read command with Address operation for a single page across two CAUs (run=2 and stride=1) can be as follows:
(Read) [block0 page0]
(Read) [block1 page0]
(GetPageStatus) [block1 page0] W4R {data+metadata}
(GetPageStatus) [block1 page0] W4R {data+metadata}

Figure 4:
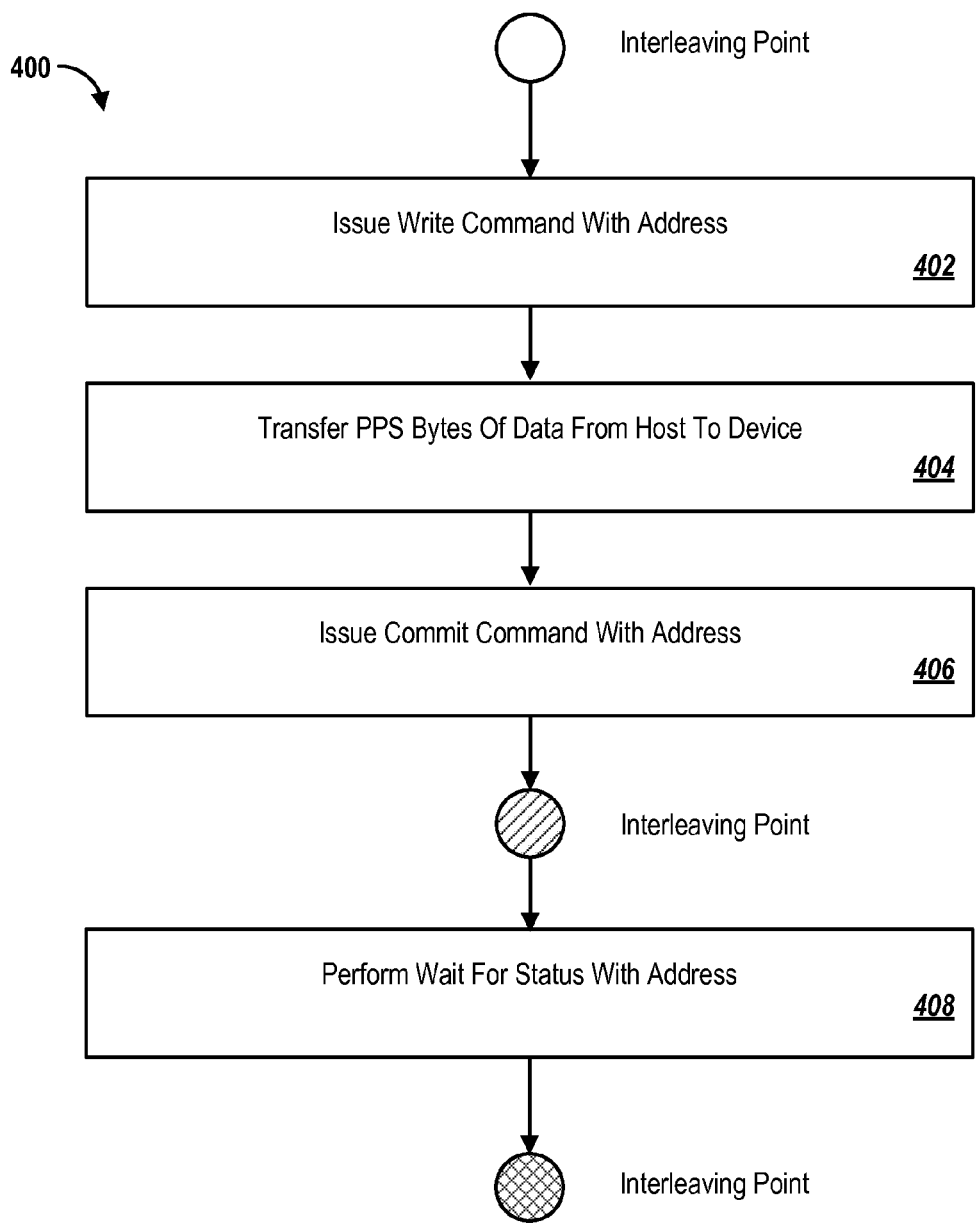
FIG. 4 is a flow a diagram of an example operation using Write with Address command.

FIG. 4 is a flow a diagram of an example operation 400 using a Write command with Address. In step 402, the host processor issues a Write command with Address. In step 404, the host processor transfers PPS bytes of data to the controller in the NVM package over the host channel. Error correction is applied to the bytes using an ECC engine. In step 406, the host processor issues a Commit command with Address which commits the non-committed write destined for a CAU to the memory array corresponding to the Address. Any corresponding ECC syndrome is also committed. In step 408, the host processor performs a Wait for status with Address sequence until the NVM package provides a status indicating that the data has been written to the Address. In this example Write command with Address operation, interleaving points may occur at the beginning and end of the operation and between intermediate steps 406 and 408 of the operation.

An example Write command with Address operation for a single page across two CAUs (run=2 and stride=1) can be as follows:
(StrideWrite) [block0 page1]<data+metadata>
(StrideWrite) [block1 page0]<data+metadata>
(GetPageStatus) [block0 page1] W4R {status}
(GetPageStatus) [block1 page0] W4R {status}
(Commit) [block0 page0]
(Commit) [block1 page0]

Figure 5:
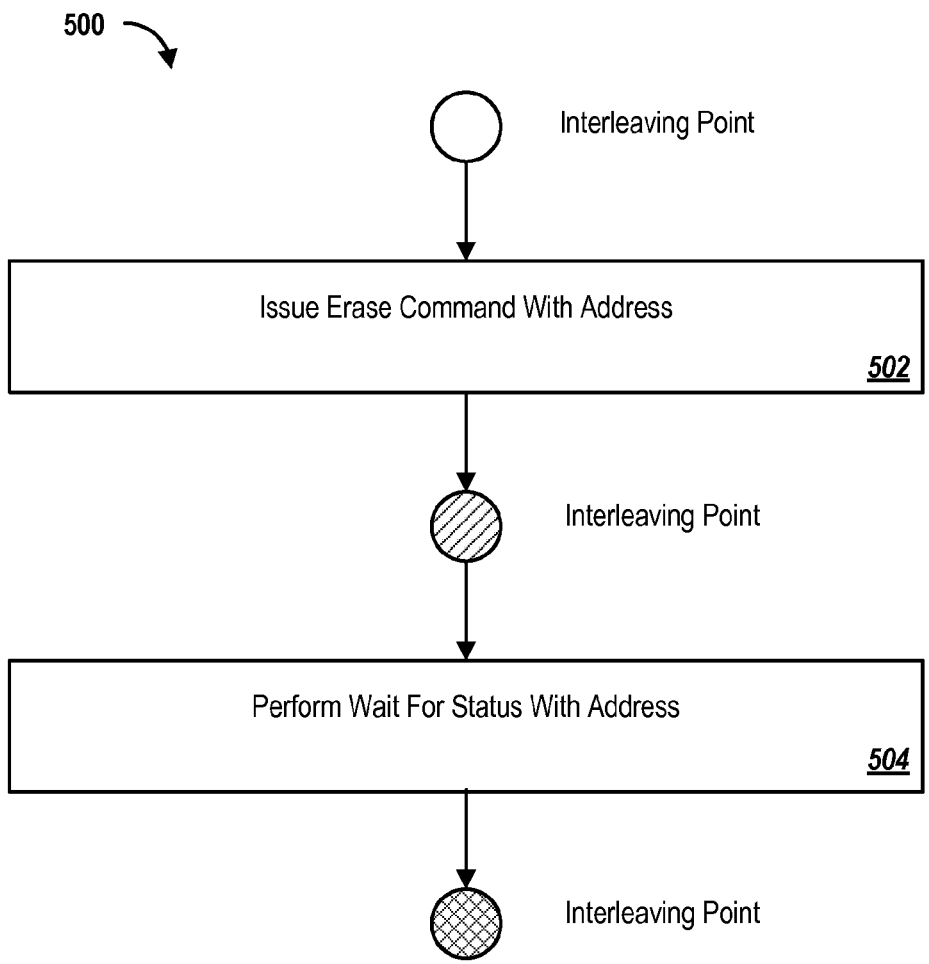
FIG. 5 is a flow a diagram of an example operation using Erase with Address command.

FIG. 5 is a flow a diagram of an example operation 500 using an Erase command with Address. In step 502, the host processor issues an Erase command with Address. In step 504, the host processor performs a Wait for status with Address until the NVM package provides status indicating that the Address is ready to be erased. In this example Erase command with Address operation, interleaving points may occur at the beginning and end of the operation and between intermediate steps 502 and 504 of the operation.

Example Stride Operations

To leverage vendor specific commands, the NVM package supports multiple page operations within a CAU. Specifically, the NVM package supports StrideRead and StrideWrite commands.

Figure 6A:
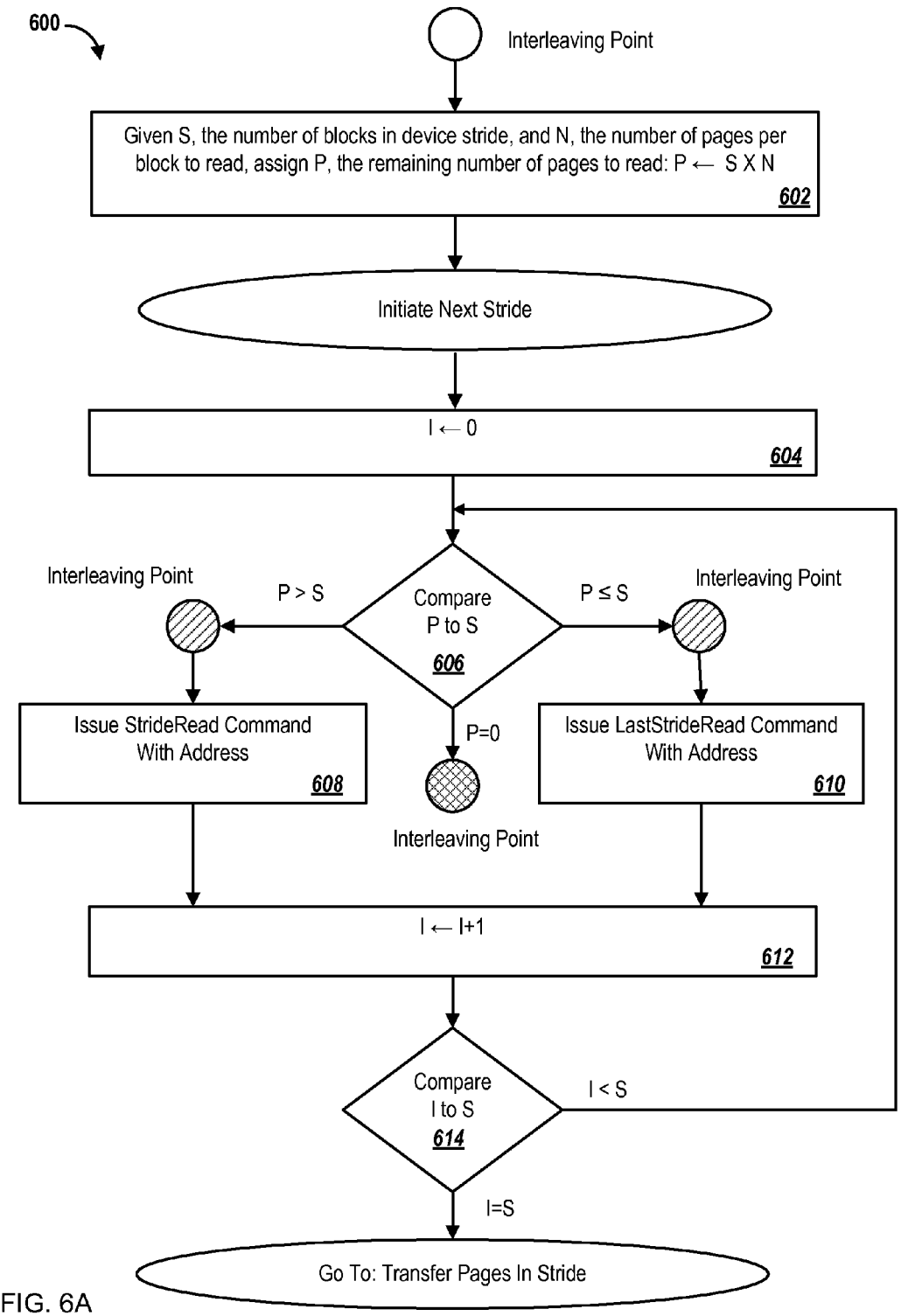
FIGS. 6A-6B are flow diagrams of an example operation using StrideRead command.
Figure 6B:
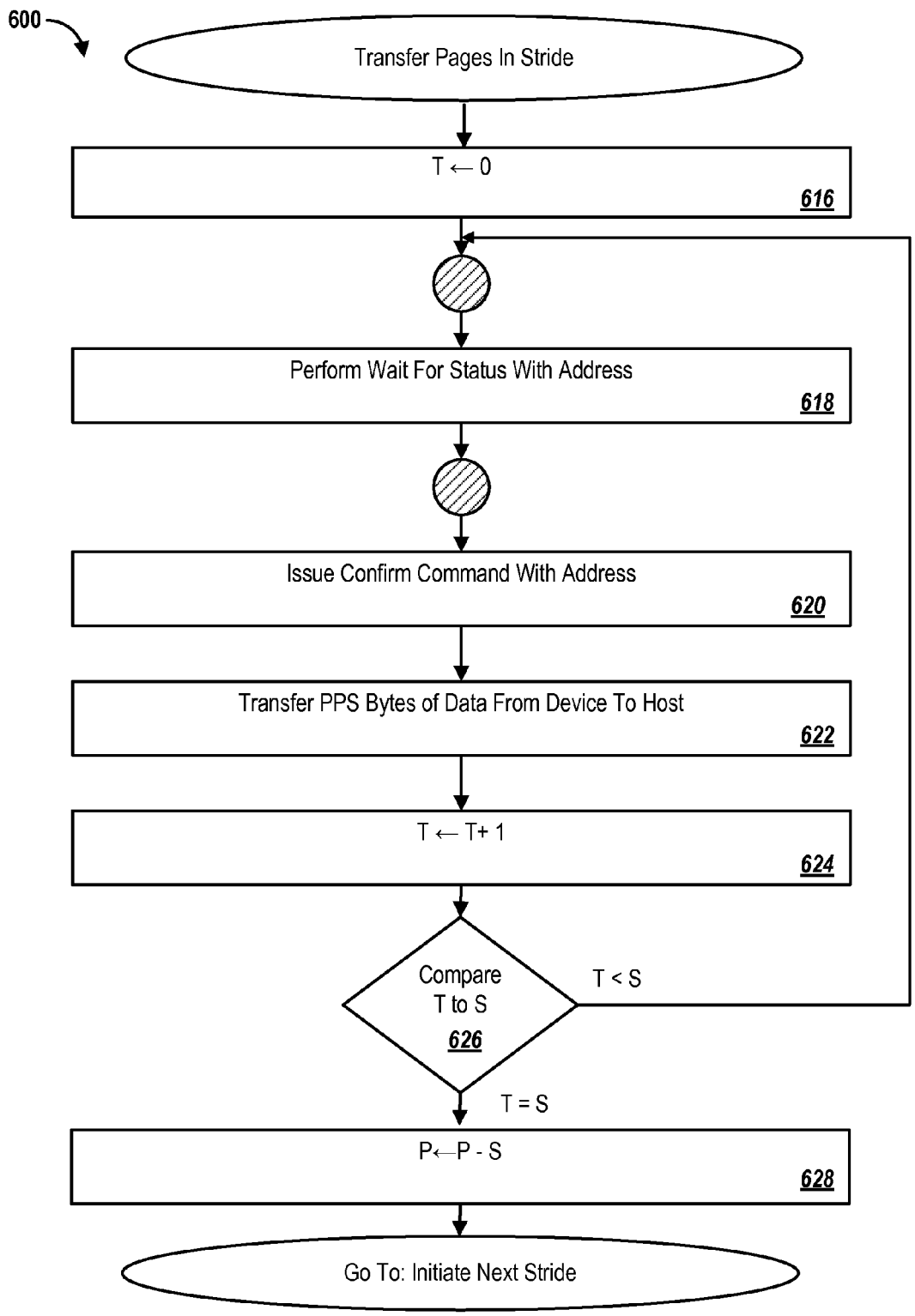

FIGS. 6A and 6B are flow diagrams of an example operation 600 using a StrideRead command with Address operation. Referring to step 602 in FIG. 6A, given S, the number of blocks in a NVM device stride, and N, the number of pages per block to be read, the remaining number of pages to be read, P, can be set equal to the product of S and N. The host processor initiates a next stride by setting a counter, I, equal to zero in step 604. In step 606, P is compared to S. If P=0, then the operation 600 ends. If P>S, then in step 608 the host processor issues a StrideRead command with Address. If P≤S, then in step 610 the host processor issues a LastStrideRead command with Address.

In step 612, the counter I is incremented by one. In step 614, I is compared to S. If I<S, then the operation 600 returns to step 606. If I=S, the operation 600 starts the transfer of pages in the stride, as described in reference to FIG. 6B.

Referring to step 616 in FIG. 6B, a counter, T, is set equal to zero. In step 618, the host processor performs a Wait for status with Address sequence until the NVM package provides a status indicating that the Address is ready to be read. In step 620, the host processor issues a Confirm command with Address. In step 622, the NVM package transfers PPS bytes of data to the host processor. In step 624, the counter T is incremented by one. In step 626, the counter T is compared to S. If T<S, then the operation 600 returns to step 618. If T=S, then in step 628 the number of remaining pages to be read, P, is decremented by S, and the operation 600 returns to step 604.

An example StrideRead with Address operation of eight pages that spread across two CAUs and four strides (run=2 and stride=4) can be as follows:
(StrideRead) [block0 page0]
(StrideRead) [block 1 page 0]
(StrideRead) [block2 page0]
(StrideRead) [block 3 page 0]
(StrideRead) [block4 page0]
(StrideRead) [block 5 page 0]
(LastStrideRead) [block6 page0]
(LastStrideRead) [block7 page0]
(GetPageStatus) [block0 page0] W4R {data+metadata}
(GetPageStatus) [block1 page0] W4R {data+metadata}
(GetPageStatus) [block2 page0] W4R {data+metadata}
(GetPageStatus) [block3 page0] W4R {data+metadata}
(GetPageStatus) [block4 page0] W4R {data+metadata}
(GetPageStatus) [block5 page0] W4R {data+metadata}
(GetPageStatus) [block6 page0] W4R {data+metadata}
(GetPageStatus) [block7 page0] W4R {data+metadata}

Figure 7:
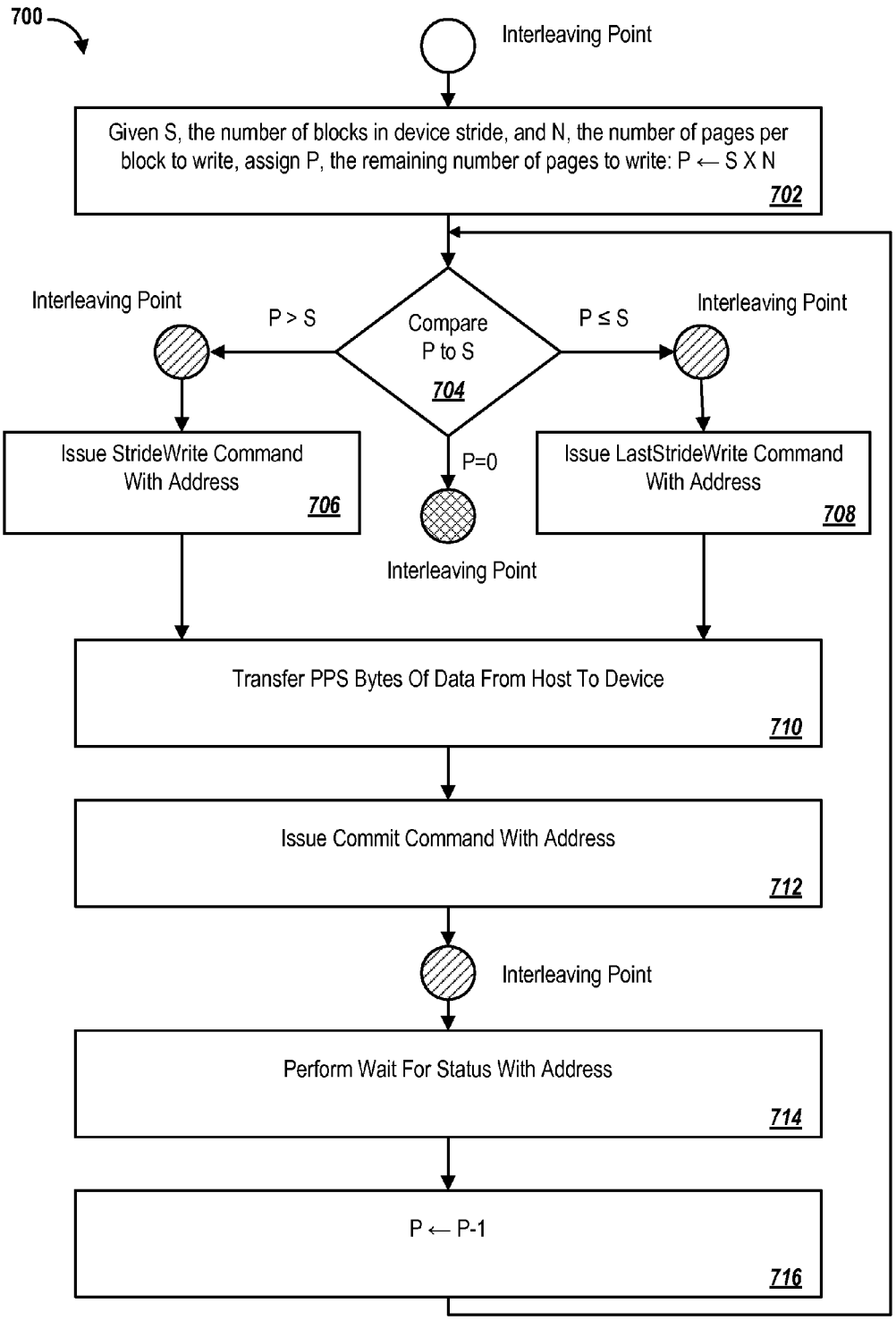
FIG. 7 is a flow a diagram of an example operation using StrideWrite command.

FIG. 7 is a flow diagram of an example operation 700 using a StrideWrite command with Address operation. Referring to step 702, given S, the number of blocks in a NVM device stride, and N, the number of pages per block to be written, the remaining number of pages to be written, P, can be set equal to the product of S and N. In step 704, the host processor compares P to S. If P=0, then the operation 700 ends. If P>S, then in step 706 the host processor issues a StrideWrite command with Address. If P≤S, then in step 708 the host processor issues a LastStrideWrite command with Address.

In step 710, the host processor transfers PPS bytes of data to the NVM package. In step 712, the host processor issues a Commit command with Address to commit the writes to memory arrays. In step 714, the host processor performs a Wait for status with Address until the NVM package provides a status indicating that the data was committed to memory. In step 716, the number of pages remaining to be written is decremented by one, and the operation 700 returns to step 704.

An example StrideWrite with Address operation of eight pages that spread across two CAUs and four strides (run=2 and stride=4) can be as follows:
(StrideWrite) [block0 page0]<data+metadata>
(StrideWrite) [block 1 page0]<data+metadata>
(GetPageStatus) [block0 page0] W4R {status}
(StrideWrite) [block2 page0]<data+metadata>
(GetPageStatus) [block1 page0] W4R {status}
(StrideWrite) [block3 page 0]<data+metadata>
(GetPageStatus) [block2 page0] W4R {status}
(StrideWrite) [block4 page 0]<data+metadata>
(GetPageStatus) [block3 page0] W4R {status}
(StrideWrite) [block5 page1]<data+metadata>

(GetPageStatus) [block4 page0] W4R {status}
(LastStrideWrite) [block6 page1]<data+metadata>
(GetPageStatus) [block5 page0] W4R {status}
(LastStrideWrite) [block7 page1]<data+metadata>
(GetPageStatus) [block6 page0] W4R {status}
(GetPageStatus) [block7 page0] W4R {status}

Example Queue Configuration

Figure 8:
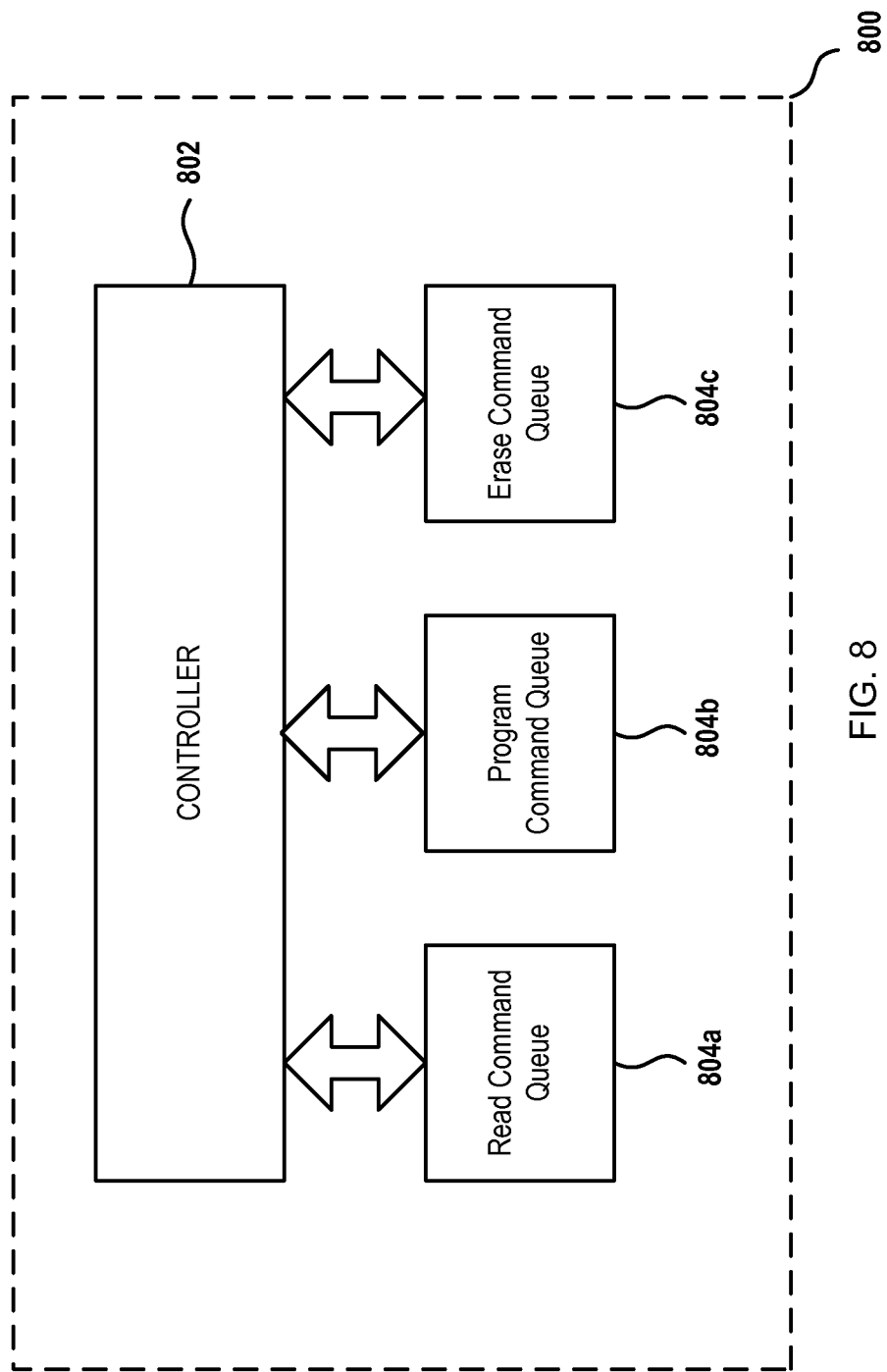
FIG. 8 illustrates the use of command queues in the NVM package of FIG. 1.

FIG. 8 illustrates the use of command queues in the NVM package. In some implementations, an NVM package 800 can include one or more queues 804 which can be accessed by a controller 802. The queues can be FIFO queues. Commands received by a host controller can be stored in the queues 804. In the example shown, there are three queues. One queue each for read, program and erase commands. In response to a trigger event, the controller 802 can reorder one or more commands in one or more of the queues 804 to optimize performance during memory operations. For example, one trigger event can be if the top item in a queue (and buffer) was destined for a plane or CAU that was busy with another operation.

Figure 9:
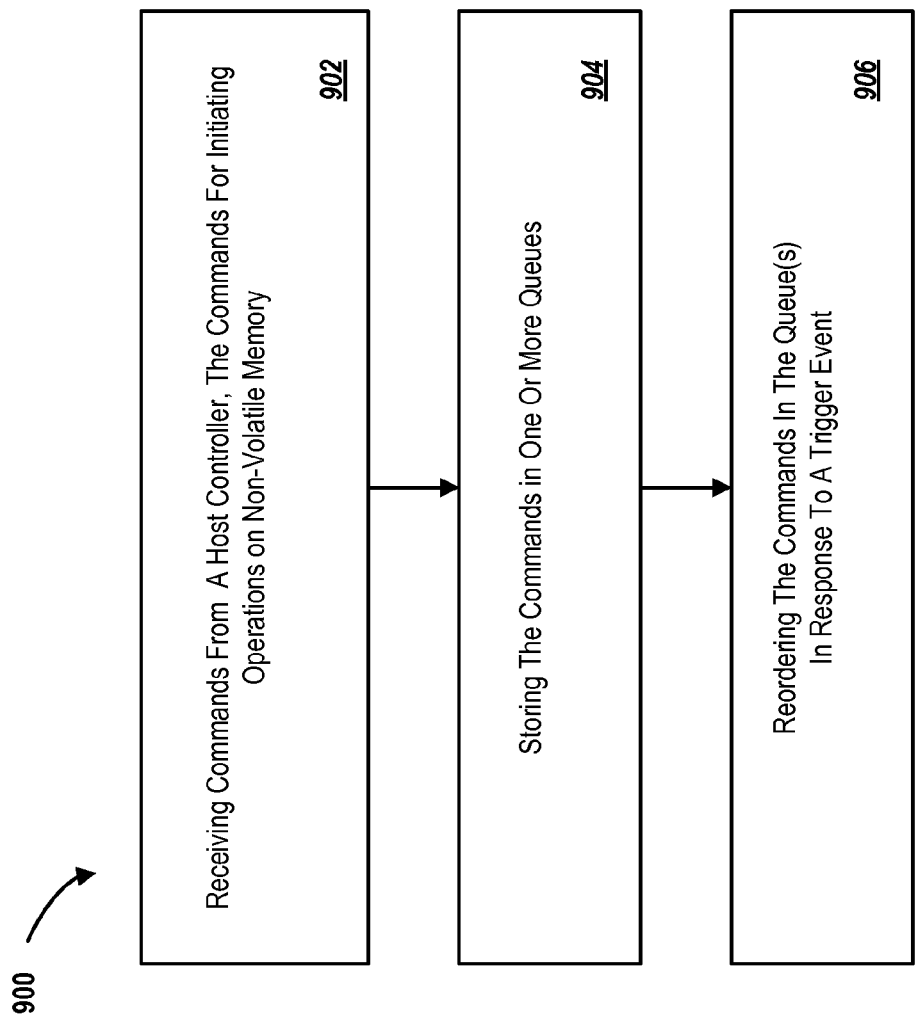
FIG. 9 is a flow diagram of an example process for reordering commands in the command queues shown in FIG. 8.

FIG. 9 is a flow diagram of an example process 900 for reordering commands in the command queues shown in FIG. 8. In some implementations, the process 900 begins by receiving commands from a host controller (902). The commands are for initiating operations on non-volatile memory. The commands are stored in one or more queues (904). For example, three separate queues can store read, program and erase commands. The commands are reordered by a controller in the non-volatile memory device in response to a trigger event (906).

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

What is claimed is:

1. A non-volatile memory (NVM) package, comprising:
an interface configured to receive a block address and a first chip enable signal from a host processor coupled to the interface;
a plurality of concurrently addressable memory units each containing a plurality of blocks; and
a processor configured to:
activate, in response to the first chip enable signal from the host processor, a first concurrently addressable memory unit using a first internal chip select enable signal;
activate a second concurrently addressable memory unit using a second internal chip select enable signal;
map the block address to blocks in the activated first and second concurrently addressable memory units;
execute a sequence of commands for concurrently performing read or write operations on the blocks in the activated first and second currently addressable memory units;
receive a command from the interface for an operation, wherein the operation includes a sequence of commands that perform atomic transactions on one or more of the concurrently addressable memory units; and
wherein a quantity of data that is read from or written to one of the one or more concurrently addressable memory units is equal to a product of N, a stride parameter for the concurrently addressable memory unit and a number of bytes equivalent to a page size plus a number of bytes associated with page allowing for metadata, where N is a positive integer representing a number of pages to be read or written, and stride is a number of blocks for operation commands within the concurrently addressable memory unit.

2. The package of claim 1, where the NVM package is a managed NAND package.

3. The package of claim 1, further comprising:
an error correction engine for applying error correction to a block of data read from, or written to the concurrently addressable memory units.

4. The package of claim 3, wherein the error detection and correction engine is included in one or more of the concurrently addressable memory units.

5. The package of claim 1, further comprising:
a pipeline management engine for managing throughput to the concurrently addressable memory units.

6. A system comprising:
a non-volatile memory (NVM) package; and
a host processor configured to provide a block address and a first chip enable signal to the NVM package, wherein the NVM package comprises a plurality of concurrently addressable memory units each containing a plurality of blocks and a processor configured to:
activate, in response to the first chip enable signal from the host processor, a first concurrently addressable memory unit using a first internal chip select enable signal,
activate a second concurrently addressable memory unit using a second internal chip select enable signal;
map the block address to blocks in the activated first and second concurrently addressable memory units;
execute a sequence of commands for concurrently performing read or write operations on the blocks in the activated first and second currently addressable memory units; and
receive a command from the interface for an operation, wherein the operation includes a sequence of commands that perform atomic transactions on one or more of the concurrently addressable memory units;
wherein a quantity of data that is read from or written to one of the one or more concurrently addressable memory units is equal to a product of N, a stride parameter for the concurrently addressable memory unit and a number of bytes equivalent to a page size plus a number of bytes associated with page allowing for metadata, where N is a positive integer representing a number of pages to be read or written, and stride is a number of blocks for operation commands within the concurrently addressable memory unit.

7. The system of claim 6, where the NVM package is a managed NAND package.

8. The system of claim 6, further comprising:
an error correction engine for applying error correction to a block of data read from, or written to the concurrently addressable memory units.

9. The system of claim 8, wherein the error detection and correction engine is included in one or more of the concurrently addressable memory units.

10. The system of claim 6, further comprising:
a pipeline management engine for managing throughput to the concurrently addressable memory units.

11. A method comprising:
receiving, by a processor of a non-volatile memory (NVM) package via an interface, a block address and a first chip enable signal from a host processor, wherein the NVM package includes a plurality of concurrently addressable memory units each containing a plurality of blocks;
activating, by the processor in response to the chip enable signal from the host processor, a first concurrently addressable memory unit of the NVM package using a first internal chip select enable signal;
activating, by the processor, a second concurrently addressable memory unit of the NVM package using a second internal chip select enable signal;
mapping the block address to blocks in the activated first and second concurrently addressable memory units;
executing a sequence of commands for concurrently performing read or write operations on the blocks in the activated first and second currently addressable memory units; and
receiving, by the processor, a command from the host processor for an operation, wherein the operation includes a sequence of commands that carry out concurrent atomic transactions on one or more of the concurrently addressable memory units;
wherein a quantity of data that is read from, or written to one of the one or more concurrently addressable memory units is equal to a product of N, a stride parameter for the concurrently addressable memory unit and a number of bytes equivalent to a page size plus a number of bytes associated with page allowing for metadata, where N is a positive integer representing a number of pages to be read or written, and stride is a number of blocks for operation commands within the concurrently addressable memory unit.

12. The method of claim 11, where the NVM package is a managed NAND package.

13. The method of claim 11, further comprising applying, by an error correction engine, error correction to a block of data read from or written to the concurrently addressable memory units.

14. The method of claim 11, wherein the error detection and correction engine is included in one or more of the concurrently addressable memory units.

15. The package of claim 14, further comprising managing, by a pipeline management engine, throughput to the concurrently addressable memory units.

* * * * *